United States Patent
Sims et al.

(10) Patent No.: US 11,068,835 B2
(45) Date of Patent: *Jul. 20, 2021

(54) BEACON TRACKING

(71) Applicant: CFPH, LLC, New York, NY (US)

(72) Inventors: Colin Sims, New York, NY (US); Jay Winters, New York, NY (US)

(73) Assignee: CFPH, LLC, New York, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/524,374

(22) Filed: Jul. 29, 2019

(65) Prior Publication Data

US 2019/0347615 A1  Nov. 14, 2019

Related U.S. Application Data (63) Continuation of application No. 15/054,545, filed on Feb. 26, 2016, now Pat. No. 10,395,208.

(60) Provisional application No. 62/121,890, filed on Feb. 27, 2015.

(51) Int. Cl.
*G06Q 10/08* (2012.01)
*H04W 4/80* (2018.01)

(52) U.S. Cl.
CPC ....... *G06Q 10/0833* (2013.01); *G06Q 10/083* (2013.01); *H04W 4/80* (2018.02)

(58) Field of Classification Search
CPC .... G06Q 10/0833; G06Q 10/083; H04W 4/80
USPC .......................................................... 705/333
See application file for complete search history.

(56) References Cited

U.S. PATENT DOCUMENTS

| | | | |
|---|---|---|---|
| 6,424,727 B1 | 7/2002 | Musgrave | |
| 2003/0014330 A1 | 1/2003 | Showghi et al. | |
| 2006/0138223 A1 | 6/2006 | Schar | |
| 2014/0370863 A1 | 12/2014 | Proctor, Jr. et al. | |
| 2015/0081581 A1* | 3/2015 | Gishen | G06Q 10/083 |
| | | | 705/330 |
| 2016/0019496 A1 | 1/2016 | Gorlin | |
| 2016/0063435 A1* | 3/2016 | Shah | G06Q 20/42 |
| | | | 705/44 |
| 2016/0253624 A1 | 9/2016 | Sims | |

OTHER PUBLICATIONS

Grau, David, et. al.; Aug. 3, 2012; "Automatically tracking engineered components through shipping and receiving processes with passive identification technologies" (Year: 2012).*
Notification of the International Search Report and the Written Opinion for International Application No. PCT/US2016/19753 dated May 19, 2016; 8 pages.
David Grau, Lei Zeng, Yang Xiao; Aug. 3, 2012; Automatically tracking engineered components through shipping and receiving processes with passive identification technologies; Elsevier (Year: 2012).

* cited by examiner

*Primary Examiner* — George Chen
*Assistant Examiner* — Dione N. Simpson (57) ABSTRACT

Some embodiments relate to the use of Bluetooth beacons for enhancing delivery tracking. A Bluetooth beacon may be carried by a delivery agent. A ID of the beacon may be detected by one or more sensors. Tracking of the delivery agent may be performed by determining where the ID is detected.

19 Claims, 2 Drawing Sheets

BEACON TRACKING

CROSS REFERENCE TO RELATED APPLICATIONS

This patent application is a continuation application of U.S. patent application Ser. No. 15/054,545, filed Feb. 26, 2016, which claims the benefit of U.S. Provisional Application No. 62/121,890, which is hereby incorporated herein by reference. U.S. patent publication 2008/0161944 entitled Method and Apparatus for Group Filtered Reports, U.S. patent publication 2008/0195538 entitled Payment During Trial Period of Referral Service, U.S. patent publication 2009/0083135 entitled Products and Processes for Revenue Sharing, U.S. patent publication 2009/0083324 entitled Method and Apparatus for Menu Generation, and U.S. patent application Ser. No. 13/023,740 entitled Multi-system Distributed Processing of Group Goals are all hereby incorporated herein by reference in their entirety. Any embodiments described in one or more of such patent applications and/or herein may be used in any combination with one or more embodiments described herein in any combination.

FIELD

Some embodiments may relate to electronic commerce.

BACKGROUND

Communication networks allow customers to communicate order information to merchants. Delivery of goods may be made to customers. Mobile devices (e.g., smartphones, tablets, laptops, cellphones, and so on) are becoming increasingly ubiquitous and sophisticated.

SUMMARY

The following should be interpreted as example embodiments and not as claims.

A. A method comprising: receiving, by at least one processor, an order for goods and/or services from a customer device; transmitting, by the at least one processor, the order to a merchant device; receiving, by the at least one processor, a first indication from the merchant device that a first signal from a wireless beacon of a delivery agent has been received; associating, by the at least one processor, the wireless beacon of the delivery agent with the received order; receiving, by the at least one processor, a second indication from the customer device that a second signal from the wireless beacon of the delivery agent has been received; and in response to receiving the indication from the customer device, determining, by the at least one processor, that the order has been delivered.

A.1. The method of claim A, wherein each of the first and second signals includes a unique identifier corresponding to the wireless beacon of the delivery agent and the first and second indications include the unique identifier. A.1.1. The method of claim A.1, further comprising storing a plurality of unique identifiers corresponding to a plurality of wireless beacons in memory coupled to the at least one processor and comparing the unique identifier corresponding to the wireless beacon of the delivery agent to the plurality of unique identifiers stored in memory. A.1.1.1. The method of claim A.1.1, further comprising determining that the unique identifier corresponding to the wireless beacon of the delivery agent is not included in the plurality of unique identifiers, and storing the unique identifier corresponding to the wireless beacon in memory. A.1.1.2. The method of claim A.1.1, further comprising determining that the unique identifier corresponding to the wireless beacon of the delivery agent matches one of the plurality of unique identifiers stored in memory and wherein associating the wireless beacon of the delivery agent with the order includes associating the matching unique identifier stored in memory with the order. A.1.1.2.1. The method according to claim A.1.1.2, wherein determining that the order has been delivered includes comparing the unique identifier received with the second indication to the matching unique identifier stored in memory and determining that the unique identifier received with the second indication and the matching unique identifier stored in memory are a match. A.1.2. The method according to claim A.1, wherein determining that the order has been delivered includes comparing the unique identifier received with the second indication to the unique identifier received with the first indication and determining that the unique identifier received with the second indication matches the unique identifier received with the first indication.

DETAILED DESCRIPTION

Figure 1:
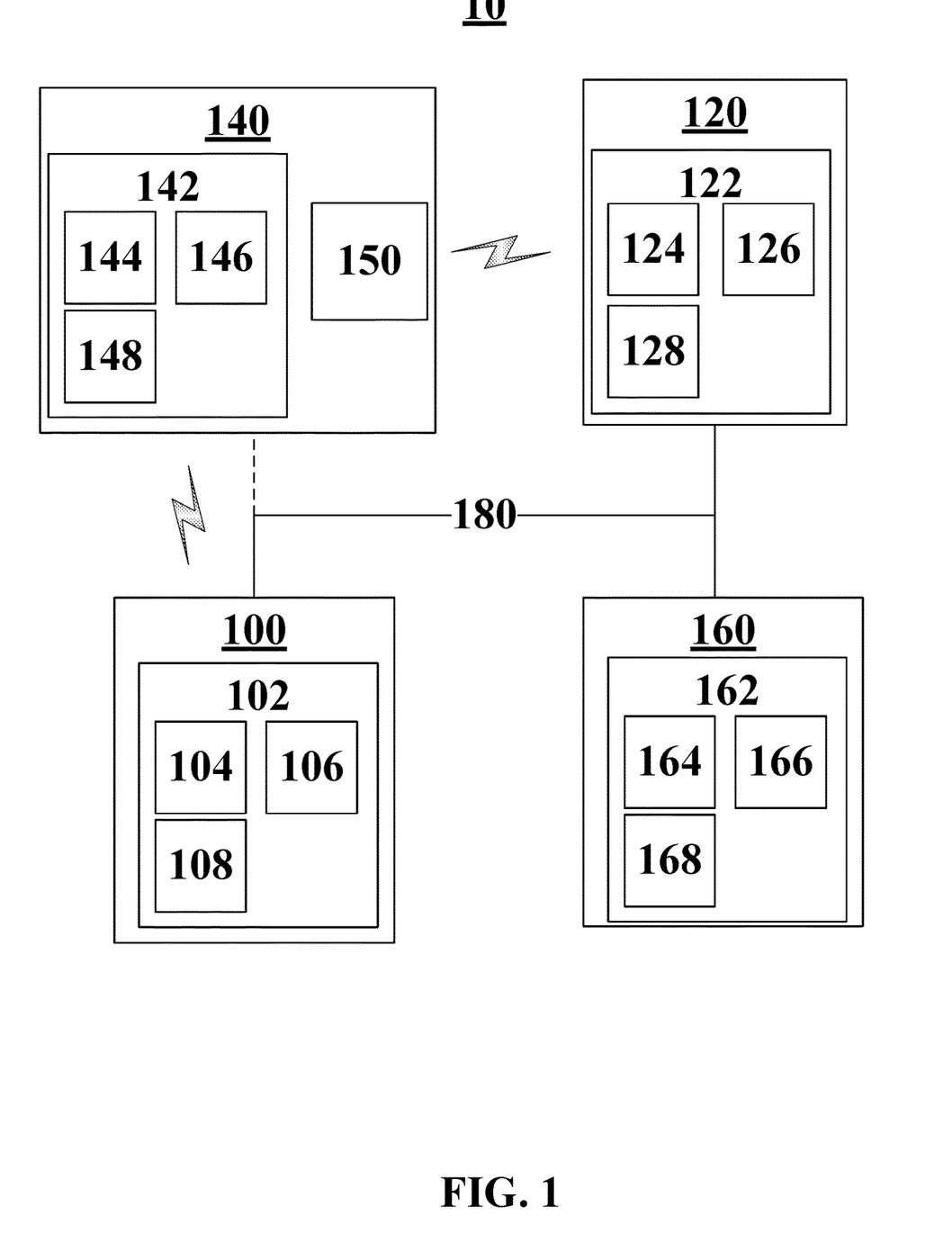
FIG. 1 depicts a system according to at least one embodiment of the systems disclosed herein.

FIG. 1 illustrates an example of a delivery system 10 that may be used in some embodiments. Such a system may be used to track movement of a person and/or an object from one location to another location. For example, such a system may be used to track the delivery of an order of goods and/or services from a merchant to a customer by a delivery agent.

System 10 includes a merchant 100, a customer 120, a delivery agent 140, a management system 160, and a network 180. It should be recognized that these elements are given as examples only and that other embodiments may include fewer, more, alternative, and so on components as desired.

Merchant

Merchant 100 may include any establishment, business, or organization that provides goods and/or services to customers. Some examples of merchant 100 may include restaurants, dry cleaners, grocery stores, big box stores, liquor stores, warehouses, and/or any other merchant that sells goods and/or services. Merchant 100 may include a retail location, for example, a brick and mortar store, may include an on-line only store, e.g., a web page, or may include both a brick and mortar store and an on-line store. Merchant 100 preferably includes at least one location from which goods and/or services may be picked up for delivery by delivery agent 140.

Merchant 100 may include a merchant device 102, for example, a desktop computer, laptop computer, tablet, server, mobile phone, smart watch or the like, that is configured to interface with devices of one or more of customer 120, delivery agent 140, management system 160, and network 180. Merchant device 102 may include at least one processor 104, memory 106, a network component 108 and/or any other component desired. Network component 108 may be configured for wired and/or wireless communication with devices of any of customer 120, delivery agent 140, and management system 160, for example, directly or via network 180. Network component 108 may also be configured for communication with the internet via network 180.

Merchant device 102 may include a Bluetooth®, and/or other wireless communication capability (e.g., wifi, induction wireless, RFID, infrared wireless, ultra wideband, nfc, zigbee, Bluetooth® Low Energy (BLE or Bluetooth® Smart), other personal area networking technology, and so on). Such capability may be enable by network component 108 and/or some other specialized component (e.g., a Bluetooth transceiver). Merchant device 102 may execute one or more instructions (e.g., run an application and/or extension) that configures merchant device 102 to monitor the surrounding area for incoming signals and/or communications and/or transmit outgoing signals and/or communications to the surrounding area. For example, a web browser extension may configure the Bluetooth® on the merchant device 102 to perform such monitoring for an incoming Bluetooth® signal and communicate when such a signal is received to management system 160. As another example, a mobile application may perform such monitoring (e.g., though an OS and/or independently) and communicate when such a signal is received to management system 160.

Merchant 100 may make one or more items available for ordering by customers through management system 160. For example, customer 120 may order one or more items and/or services from merchant 100 via a merchant web page, an application on a smartphone or other device, a telephone call with a representative of the merchant 100, in person at a brick and mortar store, or via any other form of ordering goods or services. The order may be entered by customer 120 into management system 160, e.g., via a user interface on a website or via a customer application on a smartphone, may be entered into management system 160 on behalf of the customer, e.g., by a third party, middleman, or representative associated with merchant 100, or may be entered into management system 160 using any other method suitable for use in the goods and services industry.

Merchant 100 may receive orders placed by customers through management system 160 via network 180 and may take action to deliver the ordered goods or services to the customer 120. For example, merchant 100 may contract with or employ one or more delivery agents 140 for transporting and delivering goods and/or services ordered by a customer 120 to customer 120, to a location specified by customer 120, or to another individual or company specified by customer 120.

It should be recognized that while this example is given in terms of a single merchant 100 that various embodiments may include any number of merchants 100. For example, in some embodiments, management system 160 may make goods and/or services from a plurality of merchants 100 orderable from a central location, e.g., a website, mobile application, brick and mortar store, etc. For example, menus of food items from a plurality of restaurants may be made available at the central location by management system 160 and the food items on the menus may be orderable from the central location by one or more customers 120. As another example, an order may be placed through management system 160 for goods and/or services from a plurality of merchants 100 to a single customer 120. As yet another example, a plurality of customers 120 may each make separate orders to a plurality of merchants 100.

Customer

Customer 120 may include any individual and/or organization that buys goods and/or services from merchant 100 either directly or via management system 160. For example, customer 120 may be an individual end user of the goods and/or services that the merchant 100 sells, may be a re-seller of the goods and/or services, may be an organization that has need for or utilizes the goods and/or services provided for sale by the merchant, or any other individual or organization.

Customer 120 may include a customer device 122, for example, a desktop computer, laptop computer, smart phone, smart watch, smart wearable device, tablet, smart TV, or any other similar computing device that is configured to access a web page, application and/or server of management system 160 via network 180. Customer device 122 may include at least one processor 124, memory 126, a network component 128 and/or any other desired component. Network component 128 may be configured for wired and/or wireless communication with any of merchant 100, delivery agent 140, and management system 160, for example, directly or via network 180. For example, the web page and/or server may be accessed through the use of a software application resident on the customer device 122 or installed by the customer 120 onto customer device 122. The customer 120 may submit information to the web page and/or server identifying an order of goods and/or services that the customer 120 wishes to purchase using customer device 122. Management system 160 may also provide customer 120 with a choice, if available, of which merchant 100 the customer 120 wishes to receive the identified goods and/or services from. The customer 120 may also provide to management system 160 payment and/or delivery information.

Customer device 122 may include a Bluetooth®, and/or other wireless communication capability (e.g., wifi, induction wireless, RFID, infrared wireless, ultra wideband, nfc, zigbee, Bluetooth® Low Energy (BLE or Bluetooth® Smart), other personal area networking technology, and so on). Such capability may be enable by network component 108 and/or some other specialized component (e.g., a Bluetooth transceiver). Customer device 122 may execute one or more instructions (e.g., run an application and/or extension) that configures customer device 122 to monitor the surrounding area for incoming signals and/or communications. For example, a web browser extension may configure the Bluetooth® on the customer device 122 to perform such monitoring for an incoming Bluetooth® signal and communicate when such a signal is received to management system 160. As another example, a mobile application may perform such monitoring (e.g., though an OS and/or independently) and communicate when such a signal is received to management system 160. Customer device 122 may include in memory 126 a table or database of unique identifiers corresponding to the unique identifiers of wireless beacons 150 used by delivery agents 140. For example, updated tables or databases may be downloaded periodically, on demand, by a pull or push of data and so on (e.g., from management server 160 and/or a merchant 100). As another example, a table or database may be populated when in use (e.g., when an order is pending delivery), at all times, when an application is running, and so on. As another example, a table or database may be populated in response to an order being placed, in response to a determination of a set of possible delivery agents or beacon identifiers, in response to an order being picked up, in response to some other action. In one example, the tables or databases may only include those delivery agents 140 that are active in the customers typical ordering area or region, for example, a city, town, or other locality, or within a certain predetermined distance of the customer or a location specified by the customer, for example, 60 miles. In another example, the tables or databases may reside entirely in the memory 166 of management system 160 and may not be stored at all in customer device 122.

Delivery Agent

Delivery agent 140 may include any entity that transports and/or delivers goods and/or services from a merchant 100 to a customer 120. Delivery agent 140 may be employed by merchant 100 or may be contracted to transport and/or deliver goods and/or services for merchant 100. For example, delivery agent 140 may include a delivery car or truck driver, a bicycle rider or messenger, a delivery person on foot, a drone delivery system, or other similar persons or devices that transport goods and/or services of merchant 100 to customer 120. For example, delivery agent 140 may pick up food from a restaurant and transport the food to customer 120's home for delivery in response to the customer placing an order with merchant 100. Delivery agent 140 may be assigned for the delivery by the management system 160 and/or may be chosen by or proprietary to the merchant 100.

Delivery agent 140 may include an agent device 142, for example, a desktop computer, laptop computer, tablet, mobile phone, smart wearable device or the like that is configured to interface with one or more of merchant 100, customer 120, management system 160, and network 180. Agent device 142 may include at least one processor 144, memory 146, a network component 148 and/or any other desired components. Network component 148 may be configured for wired and/or wireless communication with any of merchant 100, customer 120, and management system 160, for example, directly or via network 180. Network component 148 may also be configured for communication with the internet via network 180.

Agent device 142 may include a Bluetooth®, and/or other wireless communication capability (e.g., wifi, induction wireless, RFID, infrared wireless, ultra wideband, nfc, zigbee, Bluetooth® Low Energy (BLE or Bluetooth® Smart), other personal area networking technology, and so on). Such capability may be enable by network component 148 and/or some other specialized component (e.g., a Bluetooth transceiver).

Agent device 142 may be used to communicate with a management system or other component to facilitate delivery of orders from one or more merchants to one or more customers. Various examples of such delivery are given in the application incorporated by reference. For example, an agent device may be used to engage a bidding process for a delivery, notify an agent of a source and or destination of a delivery, and so on.

Wireless Beacon

Merchants 100 and/or delivery agents 140 may also include wireless beacons 150. For example, wireless beacons 150 may be integrated into agent device 142 or alternatively may be a standalone wireless beacon 150. Wireless beacon 150 may include a low energy wireless beacon. Such a beacon may use a low energy antenna to actively transmit a signal including a unique identifier, for example, a unique identification number, and/or other data. One example of a wireless beacon 150 that may be used is a Bluetooth® beacon. U.S. patent application Ser. No. 13/627,982, the entirety of which is hereby incorporated herein by reference, describes some functionality of such a Bluetooth® beacon. Some examples of a Bluetooth® beacon may include the Estimote® beacon and the iBeacon®. Wireless beacon 150 may wirelessly transmit a signal including a unique identifier and/or other information that may be received by a merchant device 102 and/or customer device 122. Other wireless beacon 150 technologies may also or alternatively be used including, for example, WIFI, induction wireless, RFID, infrared wireless, ultra wideband, nfc, zigbee, Bluetooth® Low Energy (BLE or Bluetooth® Smart), and similar personal area networking technologies.

In some embodiments, wireless beacon 150 may be configured to both transmit and receive signals. In other embodiments, wireless beacon 150 may be configured as a transmitter only and may not be configured to monitor and/or receive any incoming signals. This configuration may provide wireless beacon 150 with significantly increased battery life.

In some embodiments, although wireless beacon 150 is described as actively transmitting a signal throughout the specification, wireless beacon 150 may alternatively be configured as a passive beacon. For example, wireless beacon 150 may be configured to run in a low energy non-active mode for receiving incoming signals and, once a signal is received, may become temporarily active to response to receiving incoming signal by transmit a return signal to the source of the incoming signal or transmitted a signal to another target.

As indicated, some embodiments may include associating each of a set of delivery agents 140 and/or merchants 100 with one or more wireless beacons 150 including unique identifiers. Such associating may take place by linking a merchant 100 and/or delivery agent 140 with a respective unique identifier of a wireless beacon 150 through a database maintained by a management system 160.

A wireless beacon may periodically transmit a unique identifier. The transmission may be a wide broadcast and/or a directionally focused transmission. A period of broadcast may be set as desired and/or as provided by a manufacturer. In some embodiments a period of broadcast may be a second, two seconds, five seconds, one minute, five minutes, ten minutes, one hour, a microsecond, one day, and so on. In other embodiments, the transmission may occur in response to an event (e.g., a car stop, a movement, a button press), randomly, on demand, and so on.

For example, a merchant 100 may have one or more wireless beacons 150 associated therewith in such a manner. The wireless beacons 150 may be registered with management system 160 to create such a database entry. For example, a merchant 100 may purchase a wireless beacon 150 and use an interface of management system 160 to enter the unique identifier of the wireless beacon 150 into memory 166 of the management system 160 for association. As another example, an operator of a management system 160 may provide a wireless beacon 150 to the merchant after a signal including the unique identifier has been associated with the merchant 100 by the operator. In another example, the merchant device 102 may receive a signal including a unique identifier from a wireless beacon 150 and transmit the signal to the management system 160 in response to actuation of an associate control on the device (e.g., clicking a button on the device). It should be recognized that there are a number of ways in which any number of unique identifiers may be caused to be associated with a merchant 100 and/or delivery agent 140. Similar methods may be used for delivery agents 140 as are used for merchants 100 in some embodiments.

In some embodiments, a distinction between a delivery agent 140 and a merchant 100 may be blurred. For example, a delivery agent 140 may work exclusively for a merchant 100, may be an employee of a merchant 100 and so on such that some may consider the delivery agent 140 to be part of the merchant 100. A wireless beacon 150 associated with merchant 100 may therefore be provided to a delivery agent 140 and or passed between a first delivery agent 140 and a second delivery agent 140 for use with orders of the merchant 100 while on duty. For example, the merchant 100 may have a pool of wireless beacons 150 for use with deliveries from the merchant 100. Delivery agents 140 may then pull a wireless beacon 150 from the available pool, associate it with the order, deliver the product, and then return the wireless beacon 150 to the pool. In this manner, the wireless beacon 150 may then be available for use by the same delivery agent 140 or another delivery agent 140 for use in subsequent orders from a merchant. For example, a first shift delivery agent 140 and a second shift delivery agent 140 may both be associated with the same wireless beacon 150.

In some embodiments, a plurality of wireless beacons 150 may include a shared identifier. For example, a merchant 100 having a plurality of wireless beacons 150 for use by delivery agents 140 associated with the merchant 100 may wish to have only a single identifier for all of its wireless beacons 150. Likewise an organization of delivery agents 140 may also wish to have a single identifier for all of the wireless beacons 150 used by its delivery agents 140.

In other embodiments, a delivery agent 140 may work for several merchants 100 and may have a separate or personal wireless beacon 150 that is not tied to a particular merchant 100. Such a wireless beacon 150 may be registered with management system 160 to provide tracking functionality by associating the unique identifier of the wireless beacon 150 with the delivery agent 140. A database of management system 160 may track associations between unique identifiers of wireless beacons 150, merchants 100, and/or agents 140 in various combinations as desired across any number of merchants 100 and/or delivery agents 140.

Management System

Management system 160 may include, for example, a computing device 162 including at least one processor 164, memory 166, a network component 168, and any other desired component. For example, computing device 162 may include one or more servers. Memory 166 may include one or more databases storing data relating to one or more merchants 100, customer 120, delivery agents 140 and wireless beacons 150. Network component 168 may be configured for wired and/or wireless communication with any of merchant 100, customer 120, and delivery agent 160, for example, directly or via network 180. Network component 168 may also be configured for communication with the internet via network 180.

Management system 160 may include a delivery and/or referral service system. Such a system may maintain inventory information about a plurality of merchants 100 and allow customers 120 to place orders with those merchants 100 through a centralized system. For example, such a system may include a server that acts to host a webpage such as Delivery.com™ and/or that communicates information with a mobile application such as a Delivery.com™ application. Management system 160 may transmit, e.g., via network 180, or otherwise provide an order received from a customer 120 to merchant 100. The merchant 100 may then facilitate delivery of the ordered goods and/or services to the customer 120 through the use of delivery agent 140. The management system 160 may manage funds transfers such as billing the customer 120, receiving payment from the customer 120, transmitting payment to the merchant 100, and so on. Some or all of these functions may alternatively be performed directly between the customer 120 and the merchant 100 without the use of management system 160.

Management system 160 may also receive and/or store unique identifiers and other related data of wireless beacons 150 associated with various delivery agents 140 in memory 164 for later use by management system 160.

Network

Network 180 may include a communication network through which one or more devices may communicate. Such a network may include wired and/or wireless element in any combination and/or arrangement. Such a network may include one more of a LAN network, a Wi-Fi network, a mobile data network, a satellite network, the Internet, a Bluetooth network and/or any other network type in any combination or arrangement suitable for providing communication between merchant device 102, customer device 122, and management system 160. In some embodiments, Network 180 may also be configured for communication with agent device 142.

It should be recognized that examples of FIG. 1 are given as non-limiting examples only. Other arrangements and/or combinations of elements may be used as desired. For example, in some embodiments, a user may have an ordering device and a customer device that are separate things such as when one person places an order to be delivered to another person and/or when one person uses one device to place an order but also has another device (e.g., a laptop and a smartphone).

Delivery

Figure 2:
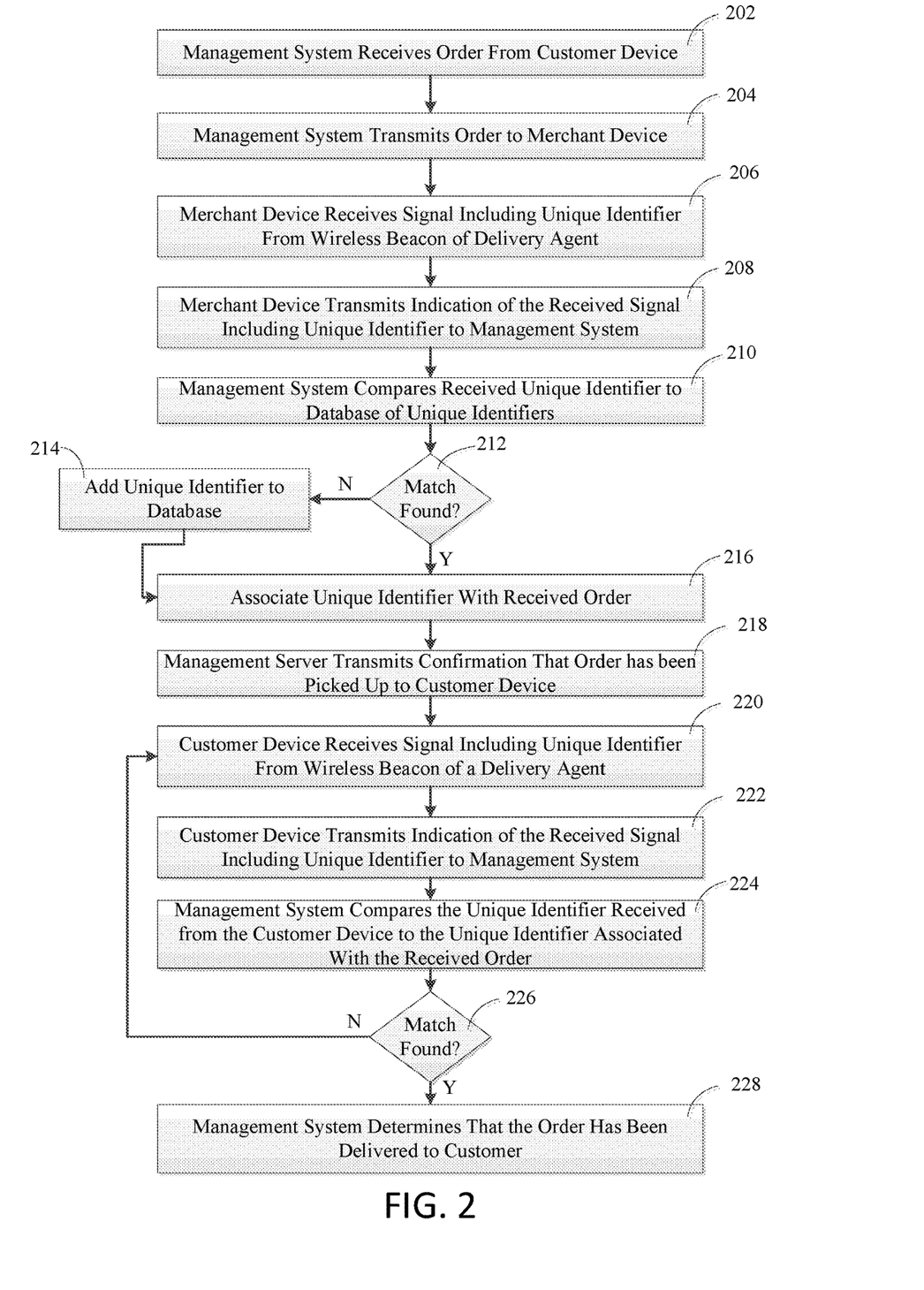
FIG. 2 depicts an example method according to at least one embodiment disclosed herein.

FIG. 2 illustrates an example method that may be performed in some embodiments. Such a method may be performed by one or more computing devices. For example, such a method may be performed by one or more elements of FIG. 1. For example, management system 160 may work together with a merchant device 102, customer device 122, agent device 142, and wireless beacon 150 to provide delivery tracking functionality in some embodiments.

Placing Orders

Management system 160 or merchant 100 may receive an order from customer 120, as shown, for example, in step 202. The order may be received, for example, via network 180 or in any other suitable manner. The order may identify a particular good and/or service that the customer desires to purchase and may indicate a particular merchant that the customer desires to purchase the good and/or service from. Alternatively, the order may not specify a particular merchant and management system 160 may select a merchant 100 based on a number of factors including proximity to the customer 120's location or a location specified in the order, average delivery time, delivery success rate, or other similar considerations. The order may indicate a quantity of one or more goods and/or services. The order may include information that may be used to facilitate payment, delivery, and/or processing. For example, an order may include special instructions for delivery (e.g., ring phone on arrival), an address for delivery, a customer device 122 to use as a location for delivery (e.g., deliver to customer or other person's mobile device location), instructions for a service or manufacture of an item (e.g., extra starch, no msg), a method of payment (e.g., an indication that cash will be presented at drop off, a credit card number, an amount), and so on. Such information may be used by a management system to facilitate placement and/or delivery of an order.

Some embodiments may include presenting a customer 120 with an ordering interface for a merchant 100. In some examples, a merchant 100 may provide a customer 120 with a merchant website, a merchant application for installation on a device, a user interface, or any form of interface for placing an order. The order may be received in an electronic form over the internet. For example, the merchant 100 may also or alternatively provide the customer 100 with a telephone number for reaching a sales representative of the merchant 100.

In other examples, management system 160 may maintain information about one or more merchants 100 and use the maintained information to present an ordering interface to the customer 120 for all or some of the merchants 100 for which information is maintained. For example, computing device 162 of management system 160 may be a server that maintains a database of orderable items from each of a plurality of merchants 100. The server may be accessible through network 180 to provide that information to potential customers. In some embodiments, a plurality of customers 120 may access a plurality of ordering interfaces for a plurality of different merchants 100 associated with the management system 160. Presenting the ordering interface may include transmitting data from merchant device 102 or computing device 162 of management system 160 to populate a web browser. An ordering interface in such an embodiment may include a web page through which a customer 120 may place orders for the merchant 100 and/or a plurality of other merchants 120. In some embodiments, an ordering interface may include a mobile application or other program configured to allow a customer 120 to place orders with the merchant 100 through the management system 160. Such a program may store data on customer device 122 and/or access data from the management system 160 to populate the ordering interface. By operating customer device 122, the customer 120 may access such data to place an order with the merchant 100 through management system 160. It should be recognized that there are multiple manners of presenting an ordering interface and that any action that may facilitate such a presentation may be made in some embodiments (e.g. by a customer device 122 such accessing a listing of items available for order or controlling a display screen to display information, by a management system 160 such as transmitting content for an interface, etc.).

In step 204, management system 160 may transmit the order to merchant 100 for fulfillment. For example, computing device 162 of management system 160 may transmit the order via network 180 to merchant device 102. The transmitted order may include details about the order including, for example, the good or service being purchased, delivery information, payment information, or other similar features common to an order for the purchase of goods and/or services.

For example, management system 160 may forward payment information to the merchant with the order. In some implementations such forwarding may be to a merchant 100 that processes the information (e.g, charges a credit card, debit card, online payment, or other payment methods). In other implementations such forwarding may be to a credit card processor for processing of the charges (e.g., to a credit card, debit card, online payment, or other payment methods). Management system 160 may perform accounting services to forward payment to a destination as desired.

As another example, management system 160 may forward information identifying ordered goods and/or services. Such information may be forwarded to one or more merchants 100 that are designated for or capable of providing the goods and/or services. Such information may be forwarded to one or more delivery agents 140 to aid in performing delivery of the good and/or services.

As another example, management system 160 may forward delivery information. Such information may be forwarded to a merchant 100 to arrange for a delivery agent 140 to deliver the order. Such information may be forwarded to a delivery agent 140 chosen to perform a delivery of the order. Various examples of choosing delivery agents 140 are described in one or more incorporated patent applications.

In a particular example, a management system may forward payment information (e.g., credit card number, online account numbers, or other payment information), goods and/or services ordered (e.g., food chosen from a restaurant menu) and a delivery location to a merchant 100. The merchant 100 may receive that information (e.g., over email, fax, phone, text, etc.). The merchant 100 may confirm the order with the management system 160. The management system 160 may notify the customer 120 that the order is accepted in response to the confirmation. The merchant 100 may charge the payment using the payment information.

Assigning a Delivery Agent to an Order

Once an order has been received by management system 160 or merchant 100, a delivery agent 140 may be assigned to the order.

In an example, delivery agent 140 may be assigned to an order at the time that the delivery agent 140 picks up the order for delivery from the merchant 100. For example, in step 206, when the delivery agent 140 arrives at the merchant 100 and picks up the order, a wireless beacon 150 of the delivery agent 140 may transmit a signal to merchant device 102 including the unique identifier associated with the wireless beacon 150. The unique identifier of delivery agent 140's wireless beacon 150 may then be associated with the order. For example, the unique identifier may be associated with the order directly by merchant 100 and the association may be transmitted to management system 160. In another example, the signal including the unique identifier and/or the unique identifier itself may be transmitted to management system 160 by merchant device 122 in step 208. In step 210, management system 160 may compare the received unique identifier to a plurality of unique identifiers stored in memory 166 of management system 160, for example, in a database or table, to identify the delivery agent 140 corresponding to the unique identifier. In step 212, management system 160 determines if a match has been found or if the unique identifier has not yet been stored in memory. If the received unique identifier has not yet been stored in memory 166, the unique identifier and/or the associated delivery agent 140 may be added to memory 166, as shown in step 214. The order may then be associated with the identified delivery agent 140 by management system 160 in step 216.

In an example, the merchant 100 may provide both the ordered goods and/or services and a wireless beacon 150 associated with the merchant 100 to the delivery agent 140 where the unique identifier of the wireless beacon 150 has already been associated with the order. The delivery agent 140 may then be associated with the wireless beacon 150 at management system 160, for example, by transmitting the association from merchant device 122 to management system 160. Alternatively, the delivery agent 140 may not be associated with the order at all, where, for example, only the wireless beacon 150 is associated with the order.

In other examples, the delivery agent 140 may be determined by management system 160 at the time that the order is placed. For example, when the customer 120 places the order with management system 160 or merchant 100, management system 160 may choose a delivery agent 140 for association with the order. For example, management system 160 may retrieve a delivery agent 140 and/or unique identifier from memory 166 and may assign the delivery agent 140 and/or unique identifier to the order, where the delivery agent 140 is associated with the wireless beacon 150 having the unique identifier.

It should be recognized that there are many ways in which a delivery agent may be assigned to facilitate a delivery of an order from a merchant to a customer. In an implementation where each agent is assigned to a unique identifier, the assignment of the agent to the order may result in determination of a unique identifier. A unique identifier may be assigned to each agent in any manner desired such as those discussed elsewhere herein and maintained by a management system. Many embodiments therefor my not include steps 206 through 214 but rather may include some other determination of a delivery agent to deliver the order such as those described in one or more incorporated patent application.

Even in such an embodiment, some implementations may include a receipt of a unique identifier by a merchant device when a chosen delivery agent is in range of a merchant device. The merchant device may be set to listen for the unique identifier in any manner desire such as those described elsewhere herein (e.g., browser extension, application, OS listening agent). In response to hearing the identifier, the merchant device may take an action. Such an action may include notifying the management system. A management system may use that information to mark an order as picked up and/or may take another action (e.g. notify a customer). In such a manner the unique identifier may be used to track an action along the chain of delivering the order. Further examples of tracking the order delivery (e.g., listening, populating tables, receiving, transmitting, etc.) are given elsewhere herein and may apply to the picking up of the order by the delivery agent from the merchant as well if desired.

Delivering the Order

Once the delivery agent 140 and/or unique identifier have been assigned to or associated with the order and the ordered goods and/or services have been picked up from the merchant 100 by the delivery agent 140, the delivery agent 140 may transport the goods and/or services to the customer 120, a location designated by the order, or to other individuals or organizations designated by the order.

In step 218, management system 160 may transmit to the customer device 122 a confirmation that the order has been picked up. The confirmation may include an identification of the association between the delivery agent 140 and/or unique identifier of the delivery agent 140's wireless beacon. The confirmation may also or alternatively direct the customer device 122 to prepare for reception of a signal from the wireless beacon 150 associated with the delivery agent 140 (e.g., activate a Bluetooth® or other wireless receiver of customer device 122 in anticipation of the incoming signal. By activating the Bluetooth® or other wireless receiver in response to the confirmation, management system 160 may assist customer 120 in preserving battery life of customer device 122 by not requiring the wireless receiver to be active all the time). In an embodiment, the confirmation may alternatively only direct the customer device 122 to prepare to receive the signal without providing any additional information on the association between the delivery agent 140 and/or unique identifier of the delivery agent's wireless beacon 150. It is also contemplated that the customer device 122 may already or always be prepared to receive the incoming signal (e.g., the Bluetooth® or other wireless signal was already activated by customer 120 prior to receipt of confirmation).

Such a notification step may be optional in some embodiments and/or may be facilitated in another manner. For example, a merchant and/or delivery agent may enter pickup information into an application or computing device that may in turn notify a management system of a pickup.

In some embodiments, movement of the delivery agent 140 may be tracked through means such as GPS, triangulation, geo-fencing, Wi-Fi network tracking, etc. or other technologies. Movement of delivery agent 140 may also be tracked by devices other than the customer device 122 en route to the customer 120 or other delivery locations. For example, any device that includes a wireless receiver suitable for receiving the signal from wireless beacon 150 and that is capable of communicating and/or interfacing with management system 160, e.g., includes an application for communicating with management system 160, may receive the signal from wireless beacon 150. If the current location of the device is known and/or can be approximated, the device may transmit to management system 160 the current location of the device and an indication that a signal from wireless beacon 150 has been received. In this manner the location of wireless beacon 150 and thus delivery agent 140 may be tracked. This may be additionally useful in circumstances where traditional location tracking services such as GPS do not function, e.g., inside steel buildings, underground, or other similar circumstances. For example, a wireless receiver may be installed at the entrance to a building, for example, at the door man or reception desk, which may receive the signal from wireless beacon 150 and transmit the signal and/or the unique identifier provided in the signal to management system 160.

In some embodiments, when delivery agent 140 approaches or passes by such a device other than the customer device 122, an indication that the delivery agent 140 approached or passed by such a device may be transmitted to management system 160 with or without location information. This indication may then be analyzed by management system 160 and provided to merchant 100, other customers 120, or other individuals or organizations. For example, the indication may allow management system 160 to ping potential customers on the delivery agent 140's route of the possibility of ordering goods and/or services from the merchant 100. Additionally or alternatively, management system 160 may provide merchant 100 with an indication of a number of other potential customers 120 that delivery agent 140 passed during delivery of the order. This information may assist the merchant in providing targeted advertisement or deals specific to those potential customers next time such a delivery is ordered. For example, when such an order is received, e.g., a food delivery order, merchant 100 may, via management system 160, offer or transmit a deal to devices of the other customers along delivery agent 140's route to also order. For example, the transmitted deals may include a time limit, e.g., within the next 5 or 10 minutes. In this manner, delivery services may be performed more efficiently since delivery agent 140 may deliver to multiple customers 100 along the route instead of making a separate trip for each customer 120 and the merchant 100 may increase sales volume. In some embodiments, the identities of the other customers who received the signal from wireless beacon 150 are not shared with merchant 100, but instead are maintained at management system 160 such that when merchant 100 requests management system 160 to provide those other customers with deals, the merchant does not specifically know which potential customers are being provided with the deals.

In some embodiments, a customer device may be controlled to listen for one or more beacon identifiers. A device may be controlled to listen for beacon signals in a variety of manners. For example, a browser extension and/or mobile application may be run on a device. The browser extension or mobile application may interface with a Bluetooth device (e.g., through an operating system) to receive Bluetooth signals that have one or more of a set of identifiers in them. In some embodiments, an operating system may be engaged to perform the listening. When the operating system detects the Bluetooth signal, the operating system may notify an application. This may enable an application to stop running or run in a passive mode until the operating system detects the signal and awakens the application thus saving system resources.

Listening for a signal may include receiving multiple Bluetooth signals and comparing them to a set of Bluetooth identifiers of interest. If a signal matches an identifier of interest an action may be taken. If the signal does not, the signal may be ignored. A program (e.g., browser extension, application, etc.), operating system, and/or hardware may take such listening actions alone and/or in combination.

In some embodiments, to facilitate listening for a beacon signal, a signals of interest may be identified. A customer device may be populated with one or more signals of interest by receiving that data from a management system. As discussed elsewhere, a table or database may track identifiers of interest. That table or database may be pushed to a customer device or pulled to the customer device from a management system. An entire set of possible identifiers may be in sent to the customer device or a smaller set identifiers just associated with an order may be sent. Various examples are given in terms of using just the smaller set but it should be recognized that all identifiers tracked by a management system may be sent in some embodiments.

Identifiers may be sent periodically, in response to an order being placed, in response to one or more identifiers for an order being determined, and so on. For example, an identifier determined for an order may be sent to a customer device in response to the order being placed. Such an arrangement might minimize data transmission and/or storage needs. As another example, all identifiers tracked by a management system may be sent to a customer device. Such sending may take place in response to an order being placed, upon installation of a program, periodically with updates, and so on. Such an arrangement may minimize calculations on a management system side and/or increase a data aggregation ability. As yet another example, some embodiments may determine a location based subset of a signals that might be relevant and sent those to a customer device. Such allocation based subset may include the identifiers in use in a city. Such information may be may be updated as a user moves form one city to another.

In step 220, when the delivery agent 140 arrives at the customer 120, for example, at the customer 120's residence, place of business, or current location, customer device 122 may receive the signal from wireless beacon 150 of delivery agent 140 including the unique identifier. Receipt of the signal by customer device 122 may cause customer device 122 to alert the customer 120 that the delivery has arrived by, for example, making a sound, displaying a popup, vibrating, or other similar visual, audio or tactile responses. This may occur in response to wireless beacon 150 of delivery agent 140 being within range of customer device 122 such that the customer 120 may be informed of the delivery agent 140's approach even before the delivery agent 140 has actually arrived. The signal and/or the unique identifier may also or alternatively be transmitted from customer device 122 to management system 160 to provide management system 160 with an indication that delivery is occurring or has occurred, as shown for example in step 222. As an example, management system 160 may compare the unique identifier of the received signal and/or the received unique identifier with unique identifiers stored in memory 166 in step 224.

Once the received unique identifiers have been matched, the management system 160 may determine that delivery of the order has occurred in step 228. The management system may in such a situation notify the customer device to stop listening for beacon identifiers. In other embodiments, it may continue to listen for beacon identifiers to facilitate various other data aggregation and tracking features as discussed elsewhere herein. If customer device 122 received a signal including a unique identifier from a wireless beacon other than the wireless beacon 150 associated with delivery agent 140, e.g., the unique identifier did not match, customer device may return to step 220 and continue waiting to receive the signal from the delivery agent 140's wireless beacon.

In some embodiments, even after the unique identifiers have been matched, management system 160 may still not determine that the delivery of the order has occurred while wireless beacon 150 is still within range of customer device 122. For example, wireless beacon 150 may repeatedly transmit the signal to customer device 122 while wireless beacon 150 is in range of customer device 122. Each time the signal is received by customer device 122, customer device 122 may provide the signal and/or the unique identifier included in the signal to management system 150. Although management system 160 may have found a match for the unique identifier, because management system 160 is still receiving the signal and/or the unique identifier from customer device 122, the delivery is still in progress and the order will not yet be confirmed as delivered. Once the delivery agent 140 leaves customer 120 and customer device 122 is out of range of wireless beacon 150, customer device will no longer receive the signal and no longer transmit the signal and/or unique identifier to management system 160. Management system 160 may then, after a predetermined period of time in which the signal and/or unique identifier is not received, determine that delivery of the order has occurred.

When management system 160 determines that delivery of the order has occurred, management system 160 may send a confirmation to customer device 122 and/or take any desired action. The confirmation may also instruct customer device 122 to de-activate the Bluetooth® or other wireless receiver that was used for receiving the signal from wireless beacon 150 if the Bluetooth® or other wireless receiver had been de-activated prior to the customer device 122 receiving confirmation of the order. By de-activating the Bluetooth® or other wireless receiver, management system 160 may assist customers 120 in preserving battery life on customer device 122. For example, where a customer 120 does not have Bluetooth® or the other wireless receiver active prior to placing the order, management system 160 effectively manages the activation and de-activation of the Bluetooth® or other wireless receiver specifically for use by the wireless beacon 150 to confirm delivery. This assists the customer 120 in preserving battery life of customer device 122 because the Bluetooth® or other wireless receiver is once again de-activated once the delivery has occurred. In some embodiments, rather than deactivating the Bluetooth component, a device may be controlled to remove one or more unique identifiers from being listened for. This may have the effect of reducing resource drain while maintaining desired functionality.

In some embodiments, customer 120 may not be available to receive the ordered goods and/or services. For example, when delivery agent 140 arrives at the location specified by customer 120, there may be no customer 120 or customer device 122 present to receive the order and/or the signal from wireless beacon 150. In this case, for example, delivery agent 140 may utilize agent device 142 to transmit a signal to management system 160 indicating that the order has been delivered. In some embodiments, the ordered goods and/or services may include a wireless beacon 150 such that when the customer returns home or enters the area where the order was delivered, the wireless beacon 150 of the ordered goods and/or services transmits the signal to customer device 122 in the manner described elsewhere.

In another example, even though customer 120 is not present, a customer device 122 may still be present. For example, customer 120 may have left a customer device 122 at the delivery location, or may have installed a customer device 122 including a wireless receiver suitable for receiving the signal from wireless beacons 150 in proximity to the delivery location. In this manner, the signal may be communicated to the customer device 122 and to management system 160 in the manner described above to confirm delivery. The customer 120, who is not present for the delivery, may then receive an alert from management system 160 or the installed customer device 122 on a customer device 122 that is with the customer 120 indicating that the order has been delivered.

In some embodiments, for example, an order may be placed from one location (e.g., near a smartphone) to be delivered at another location (e.g., near a tablet). In such an embodiment, a listening may be engaged in the delivery location (e.g., at the customer's tablet) and a notification of delivery may be sent to an order placement location (e.g., to the tablet). Similarly, a customer device may move from location to location during a delivery period so that it may be at a delivery location at one time but not at a later time. A management system may track the movement of one or more customer device and control them so that a device at the delivery location is listening for a beacon identifier during a delivery period.

Some embodiments may include determining a location for delivery of an order. For example, a delivery location may entered with the order by a customer 100, a delivery location may be determined based on a location of a customer device 122 placing an order (e.g., from GPS, triangulation, geofencing, etc.), and/or a location may be determined in any desired manner. The location for delivery may be a same or similar to a location of a customer. For example, if a customer is not at their place of residence or another address, e.g., at a park, camping, beach, soccer field, parking lot, etc., they may still wish to receive delivery of an order.

To fulfill this need, a variety of location determination techniques may be used. Management system 160 may, for example, make such a determination (e.g., receive a report from a customer device 122, query a location determination service, etc.). Such information may be used to determine which merchants 100 a customer 120 may order from and/or whether a customer 120 is authorized to order from a selected merchant 100 (e.g., a customer 120 may be authorized to order from a merchant 100 if the delivery location is within a delivery range of a merchant 100 that may be maintained in a database of merchants 100 for each merchant 100 by a management system 160). Such information may be used to facilitate delivery of an order (e.g., by notifying a delivery agent 140 and/or merchant 100 of a location for a delivery).

In some embodiments in order to facilitate delivery of an order to a customer location that may be mobile or not at a traditional address, management system 160 may determine a location for the customer device 122. For example, the customer may indicate in the order that he or she is located in a park by a specific space, statue, or other landmark. The delivery agent 140 may then travel to the location for delivery. Once delivery agent 140 approaches close enough to customer device 122 that customer device 122 is within range of the delivery agent 140's wireless beacon 150. The delivery may then proceed as described elsewhere. The delivery agent 140 and/or the customer 120 may meet one another to finish the delivery.

In such an embodiment, for example, customer device 122 may determine a distance and/or direction of delivery agent 140 based on the received signal and may indicate to customer 120 a direction to travel and/or a distance to reach delivery agent 140. Alternatively and/or additionally, the customer device may notify the management system of such information and in response, the management system may notify the deliver agent device. In this way, a delivery agent may be directed to the customer by use of a signal detection from a beacon signal.

In another embodiment, when it has been determined that delivery agent 140 and customer 120 are within the range of wireless beacon 150, fine location determination services such as GPS may be employed on one or both of customer device 122 and agent device 142 to further assist the customer 120 and delivery agent 140 in finding each other. In one example, customer device 122 may only temporarily provide GPS coordinates to management system 160 which may then be provided by management system 160 to agent device 142 for use by delivery agent 140 where, for example, the customer may then exit the provided coordinates without being further tracked if so desired. In another example, customer device 122 may occasionally provide GPS coordinates to management system 160 for use by delivery agent 140 until the delivery is complete. In another example, agent device 142 may provide GPS coordinates to management system 160 which may then be provided to customer device 122 to assist the customer in finding delivery agent 120. This example provides the customer with additional control of the final portion of the delivery process and may reduce a drain on customer device resources.

In another example, once the customer has received a notification that customer device 122 is within range of the delivery agent 140's wireless beacon, customer 120 may use customer device 122 to specify, e.g., through a message or other similar communication, a particular location at which the customer 120 would like to meet the delivery agent 140. For example, customer device 122 may transmit the message to management server 160 which may then provide the message to delivery agent 140. Alternatively, management server 160 may allow customer device 122 and/or agent device 142 to initiate a voice call to assist in the final location determination.

Tracking and Analytics

Throughout the delivery process movement of delivery agent 140 may be tracked for data gathering purposes. For example, when delivery agent 140 picks up the order from merchant 100, the signal from wireless beacon 150 of delivery agent 140 is transmitted to merchant device 102, and the signal and/or unique identifier is transmitted from merchant device 102 to management system 160, management system 160 may log a first timestamp of the transaction. Likewise, when delivery agent 140 arrives at the customer location, the signal from wireless beacon 150 is transmitted to customer device 122, and the signal and/or unique identifier is again transmitted from customer device 122 to management system 160, management system 160 may log a second timestamp of the transaction. Management system 160 may then analyze the time difference between the first and second timestamps to determine the amount of time or duration that it took for the delivery agent 140 to deliver the order from the merchant 100 to the customer 120. The duration of additional deliveries from the merchant 100 to the same customer 120 or to other customers 120 located near the same customer 120 may be also tracked. These durations may then be aggregated together to determine an average delivery time. This average delivery time may then be provided to the customer 100 as an estimated delivery time prior to or upon receipt of the order. In some embodiments, management system 160 and/or merchant 100 may utilize statistical calculations to determine an estimated delivery time other than an average delivery time. For example, outlier values, e.g., extra long delivery times due to accidents or other rare occurrences may be discounted when calculating the estimated delivery time.

In some embodiments, individual delivery agents 140 or organizations of delivery agents 140 may be tracked in the manner described above to determine respective average delivery times. The average delivery times for each delivery agent 140 or organization of delivery agents 140 may then be provided to merchants 100 by management system 160 and/or utilized by management system 160 in prioritizing the selection of delivery agents 140 for use in deliveries. For example, where delivery agent A on average takes 10 minutes to deliver the order and delivery agent B on average takes 20 minutes to deliver the order, based on the collected tracking data, management system 160 may prioritize orders to delivery agent A over delivery agent B. Likewise such data may be provided to merchants 100 by management system 160, for example, transmitted to merchant device 102 via network 180, to enable the merchants 100 to assess the overall quality of their delivery agents 140.

In some embodiments, management system 160 may also utilize the received indications from other customer devices found on the delivery route, as describe above, to further track the movement of delivery agents 140. These indications may be utilized to determine the delivery agent 140's travel route and may be applied to a mapping program by merchant 100, delivery agent 140, and/or management system 160 to assist the delivery agent 140 in adjusting the route to optimize delivery efficiency and reduce delivery times. The received indications from other customer devices may also be utilized in conjunction with more traditional location monitoring services such as GPS, mobile network triangulation, or other similar services to further track the movement of delivery agent 140.

In some embodiments, a delivery may be targeted to one individual, but a customer nearby or on the route to that individual may have a device that listens for beacons signals. For example, a neighbor to a customer may have an app installed on a phone that listens for beacons signals. That data from the third party may be aggregated or used in some manner in some embodiments. For example, advertising may be presented to a user based on his or her neighbor's preference for delivery. As another example, that neighbor's device may be used to track the delivery rather than the customer's own device.

Data may be aggregated across multiple beacon hits across one or more people. Such data may be used in various embodiments. For example, the data may be used to determine and/or improve the efficiency of a delivery network. As another example, the data may be used as an advertising tool to a merchant and/or customer (e.g., a customer may be notified that a pizza delivery driver passes them every five minutes, a merchant may be notified that a delivery network reaches hundreds of possible customers every minutes, etc.).

It should be recognize that various arrangements of receiving and forwarding information for facilitating order placement and/or delivery may be performed. Such arrangements may depend for example on who is responsible for various parts of a process and/or whether a merchant has a proprietary delivery agent. One of ordinary skill in the art would recognized that a wide variety of such arrangements and combinations that are contemplated. Any of the above described embodiments and examples may be combined or used together, where applicable without departing from the scope of the present disclosure.

It should be recognized that although various examples are given with multiple entities acting as intermediaries, that some embodiments may include no such intermediaries, more such intermediaries, ad/or different such intermediary. For example, some embodiments may include a distributed system. Some embodiments may include a system where a user, a payment processing service, and/or a system a system 10, and/or payment processing device perform any role that may have been performed by one of the others. For example, a user may directly communicate with a payment processing device, may perform payment processing, and so on. Such actions and/or other actions may be performed by any entity in any combination.

Various examples may refer to a system such as system 10. It should be recognized that such references are given as examples only and that system 10 and FIG. 1 are both given as examples only. Various embodiments may include any system(s) in any configuration and/or no system that may or may not include any characteristics similar to system 10 and any reference to system 10 may refer to any other system with or without such characteristics.

Some embodiments have been described as involving a unique identifier. It should be recognized that such embodiments have been given as non limiting examples only. Other embodiments may have identifiers that are not unique at all.

It should be recognized that although various embodiments are given in terms of a good being delivery and/or otherwise provided, that some embodiments may relate to providing a service rather than a good. For example, selection of a service provider of any sort may be made in some embodiments, selection of goods to be used by a service provider may be made in some embodiments, selection of sub-contractor(s) to a service provider may be made in some embodiments, providing any such selected item may be made in some embodiments, and so on.

Some embodiments may have been described in terms of a single delivery agent and/or other service provider performing a delivery or other service from a single and/or multiple merchants to a single and/or multiple customers. In some embodiments, multiple delivery agents and/or other service providers may be used to make a single and/or multiple deliveries and/or perform any desired service involving a single and/or multiple sources, and/or a single and/or multiple customers and/or destinations. Some embodiments may include facilitating using multiple service providers to provide a service as desired.

FIG. 2 is shown with arrows and discussed in terms of steps. It should be recognized that this convention is a non-limiting example. Other embodiments may have a different order and/or different steps. Steps may be discrete or overlapping. For example, one action may accomplish more than one of the defined steps. In other embodiments multiple actions may be taken to accomplish one defined step.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

Additional Example

The following is an example of how one embodiment may function in a specific situation.

Mary and some of her friends are hanging out at her house. Around dinner time, they decide that instead of going out to dinner, they would rather stay in and order delivery. Mary opens the Delivery.com™ application on her smart phone and looks through a list of local restaurants that deliver to her house. Once a restaurant has been chosen, the Delivery.com™ application presents a menu of the different dishes that are available from the restaurant. Mary and her friends select the dishes that they want and place an order for delivery to her house with the Delivery.com™ application.

The Delivery.com™ application sends the order to a server which in turn sends the order to the restaurant. The server may assign a deliveryman to the order or in some cases the restaurant may instead choose the deliveryman. When the deliveryman arrives at the restaurant to pick up the order a Bluetooth® beacon that is carried by the deliveryman sends a signal to the restaurant, for example, to a computer or a smartphone owned by the restaurant. The signal includes information that uniquely identifies the Bluetooth® beacon, and thus the deliveryman. The signal is similar to how your phone would communicate with your car for hand-free calling, music, or navigation. Once the signal is received by the restaurant, the deliveryman is associated with the order and identified as having picked up the order. This information is sent back to the server.

The server may then send a message to Mary, by email, text, the Delivery.com™ application, or in some other manner, that the order has been picked up from the restaurant and is on its way to her house.

When the deliveryman arrives at Mary's house, the Bluetooth® beacon sends out the signal including the information that uniquely identifies the Bluetooth® beacon. Mary's smart phone receives the signal and provides Mary with an alert or warning such as a ring, vibration, popup, or something similar, that the deliveryman has arrived. Mary's smartphone also sends the information to the server, informing server that the order has been delivered.

Processes and/or Apparatus

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

VIII. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Further Embodiments

It should be recognized that when a delivery agent is referenced herein that such a reference is given as a non-limiting example only. Some embodiments may include a delivery service provider with any number of employees. Some embodiments may include a delivery service provider that acts as an agent. Some embodiments may include a delivery service provider that acts as a principle. Any service provider may utilize such an auction system or any selection system described herein or elsewhere.

It should be recognized that although various examples are given in which a delivery agent places one bid, that some embodiments may include any desired auction system. For example, a traditional auction may be used, a reverse auction may be used, a silent auction may be used, a secret auction may be used, an open auction may be used, and so on. In some embodiments, an auction may have a reserve price and/or time. In some embodiments, an auction may have a limited period of time. In some embodiments, a delivery agent may submit changes to a bid and/or updated bids. In some embodiments a delivery agent may be able to see information about competing bids. In some embodiments, information about other delivery agent bids may be provided to a delivery agent. In some embodiments more than one bid may be received from a delivery agent.

In some embodiments, for example, a delivery agent may receive an indication of a bid by another delivery agent. In response to receiving such an indication, the delivery agent may determine a bid to be placed. Such a bid may be a second bid by the delivery agent. Such a bid may be for a lower price than a first bid by the delivery agent. Such a bid may be for a better time than the first bid. Such a bid may be for a lower price and/or better time than the bid by the other delivery agent. Such a bid may be based on cost of providing the service. In response to determining such a bid, an indication may be transmitted.

It should be recognized that while FIG. 3 illustrate one non-limiting example method, other embodiments may include any method desired which may include same or different actions in any desired order and/or number. For example, various portions of FIG. 3 may be utilized with respect to any selection process discussed herein or elsewhere (e.g., filtering for pre-ordered delivery auctions, etc.). It should be recognized that action of such a process may be performed by any entity as desired in various embodiments.

What is claimed is:

1. A method comprising:
controlling, by at least one processor:
receiving, an order for at least one item from a first computing device;
transmitting the order to a second computing device;
receiving a first indication from the second computing device that a first signal from a wireless beacon of a third computing device has been detected by the second computing device;
in response to receiving the first indication,
(i) associating the wireless beacon of the third computing device with the order, and
(ii) transmitting a confirmation that controls operation of a wireless receiver associated with the first computing device to detect a given signal from the wireless beacon;
after the wireless beacon is associated with the order, receiving a second indication from the first computing device that a second signal from the wireless beacon has been detected by the wireless receiver; and
in response to receiving the second indication, determining that the order has been delivered.

2. The method of claim 1, wherein each of the first and second signals includes a unique identifier corresponding to the wireless beacon and the first and second indications include the unique identifier.

3. The method of claim 2, further comprising controlling, by the at least one processor:
storing a plurality of unique identifiers corresponding to a plurality of wireless beacons in memory coupled to the at least one processor; and
comparing the unique identifier corresponding to the wireless beacon to the plurality of unique identifiers stored in the memory.

4. The method of claim 3, further comprising controlling, by the at least one processor:
determining that the unique identifier corresponding to the wireless beacon is not included in the plurality of unique identifiers, and
storing the unique identifier corresponding to the wireless beacon in the memory.

5. The method of claim 3, further comprising controlling, by the at least one processor:
determining that the unique identifier corresponding to the wireless beacon matches one of the plurality of unique identifiers stored in the memory, wherein associating the wireless beacon with the order includes associating the matching unique identifier stored in the memory with the order.

6. The method according to claim 5, wherein determining that the order has been delivered includes comparing the unique identifier received with the second indication to the matching unique identifier stored in the memory and determining that the unique identifier received with the second indication and the matching unique identifier stored in the memory are a match.

7. The method according to claim 2, wherein determining that the order has been delivered includes comparing the unique identifier received with the second indication to the unique identifier received with the first indication and determining that the unique identifier received with the second indication matches the unique identifier received with the first indication.

8. The method according to claim 1, further comprising controlling, by the at least one processor, the first computing device whether to operate to detect the given signal, when the order is determined to have been delivered.

9. The method according to claim 1, further comprising:
controlling, by the at least one processor, de-activating the wireless receiver to detect the given signal from the wireless beacon, when the order is determined to have been delivered.

10. An apparatus comprising:
at least one processor configured to control:
receiving an order for at least one item from a first computing device;
transmitting the order to a second computing device;
receiving a first indication from the second computing device that a first signal from a wireless beacon of a third computing device has been detected by the second computing device;
in response to receiving the first indication,
  (i) associating the wireless beacon of the third computing device with the order, and
  (ii) transmitting a confirmation that controls operation of a wireless receiver associated with the first computing device to detect a given signal from the wireless beacon;
after the wireless beacon is associated with the order, receiving a second indication from the first computing device that a second signal from the wireless beacon has been detected by the wireless receiver; and
in response to receiving the second indication, determining that the order has been delivered.

11. The apparatus of claim 10, wherein each of the first and second signals includes a unique identifier corresponding to the wireless beacon and the first and second indications include the unique identifier.

12. The apparatus of claim 11, wherein the at least one processor is configured to control:
storing a plurality of unique identifiers corresponding to a plurality of wireless beacons in memory coupled to the at least one processor; and
comparing the unique identifier corresponding to the wireless beacon to the plurality of unique identifiers stored in the memory.

13. The apparatus of claim 12 wherein the at least one processor is configured to control:
determining that the unique identifier corresponding to the wireless beacon is not included in the plurality of unique identifiers, and
storing the unique identifier corresponding to the wireless beacon in the memory.

14. The apparatus of claim 12, wherein the at least one processor is configured to control:
determining that the unique identifier corresponding to the wireless beacon matches one of the plurality of unique identifiers stored in the memory,
wherein associating the wireless beacon with the order includes associating the matching unique identifier stored in the memory with the order.

15. The apparatus according to claim 14, wherein determining that the order has been delivered includes comparing the unique identifier received with the second indication to the matching unique identifier stored in the memory and determining that the unique identifier received with the second indication and the matching unique identifier stored in the memory are a match.

16. The apparatus according to claim 11, wherein determining that the order has been delivered includes comparing the unique identifier received with the second indication to the unique identifier received with the first indication and determining that the unique identifier received with the second indication matches the unique identifier received with the first indication.

17. The apparatus according to claim 10, wherein the at least one processor is configured to control the first computing device whether to operate to detect the given signal, when the order is determined to have been delivered.

18. The apparatus according to claim 10, wherein the at least one processor is configured to control de-activating the wireless receiver to detect the given signal from the wireless beacon, when the order is determined to have been delivered.

19. A non-transitory storage medium configured to record instructions which, when executed by at least one processor, control:
receiving an order for at least one item from a first computing device;
transmitting the order to a second computing device;
receiving a first indication from the second computing device that a first signal from a wireless beacon of a third computing device has been detected by the second computing device;
in response to receiving the first indication,
  (i) associating the wireless beacon of the third computing device with the order, and
  (ii) transmitting a confirmation that controls operation of a wireless receiver associated with the first computing device to detect a given signal from the wireless beacon;
after the wireless beacon is associated with the order, receiving a second indication from the first computing device that a second signal from the wireless beacon has been detected by the wireless receiver; and
in response to receiving the second indication, determining that the order has been delivered.

* * * * *